US010654733B2

(12) United States Patent
Pradeau et al.

(10) Patent No.: US 10,654,733 B2
(45) Date of Patent: May 19, 2020

(54) MOBILE, REPLACEABLE, AND REGENERABLE CARTRIDGE FOR TREATMENT OF WATER

(71) Applicant: BFG ENVIRONMENTAL TECHNOLOGIES, Illkirch-Graffenstaden (FR)

(72) Inventors: Paul Pradeau, Strasbourg (FR); Remy Francois, Obermodern (FR)

(73) Assignee: BFG Environmental Technologies, Illkirch-Graffenstade (FR)

( * ) Notice: Subject to any disclaimer, the term of this patent is extended or adjusted under 35 U.S.C. 154(b) by 132 days.

(21) Appl. No.: 15/570,602

(22) PCT Filed: Apr. 29, 2016

(86) PCT No.: PCT/FR2016/051019
§ 371 (c)(1),
(2) Date: Oct. 30, 2017

(87) PCT Pub. No.: WO2016/174371
PCT Pub. Date: Nov. 3, 2016

(65) Prior Publication Data
US 2018/0127291 A1    May 10, 2018

(30) Foreign Application Priority Data

Apr. 30, 2015  (FR) .................................. 15 53958

(51) Int. Cl.
*C02F 3/12* (2006.01)
*C02F 1/42* (2006.01)
(Continued)

(52) U.S. Cl.
CPC .............. *C02F 3/1236* (2013.01); *C02F 1/42* (2013.01); *C02F 1/441* (2013.01); *C02F 1/78* (2013.01);
(Continued)

(58) Field of Classification Search
CPC .......... C02F 2201/006; C02F 2201/008; C02F 2203/006; C02F 1/78; C02F 1/42; C02F 3/1236; C02F 1/441
See application file for complete search history.

(56) References Cited

U.S. PATENT DOCUMENTS 3,498,457 A * 3/1970 Gough ..................... C02F 1/325
210/244
5,128,035 A * 7/1992 Clack ..................... B01D 61/022
210/251
(Continued)

FOREIGN PATENT DOCUMENTS

EP        2433907 A1      3/2012
WO     03 106003 A1      12/2003
WO    2007 132170 A1    11/2007

*Primary Examiner* — Ana M Fortuna
(74) *Attorney, Agent, or Firm* — Craft Chu PLLC; Andrew W. Chu

(57) ABSTRACT

The mobile water treatment cartridge is connectable into a water treatment circuit and includes fluid connectors and power and data connection ports. The cartridge includes an outer shell having an upper opening that can be hermetically sealed by a lid, and an inner shell having an opening at the top and delimiting an internal volume of the cartridge, in which all the technical equipment for operation of the cartridge is placed. The inner shell is secured to at least one structure that can be inserted into the interior volume through the opening. There is a device for handling the cartridge secured to the outer shell and a device for rendering the cartridge mobile.

16 Claims, 2 Drawing Sheets

(51) Int. Cl.
*C02F 1/44* (2006.01)
*C02F 1/78* (2006.01)
*C02F 103/00* (2006.01)
*B01D 63/02* (2006.01)

(52) U.S. Cl.
CPC .. *C02F 2103/005* (2013.01); *C02F 2201/006* (2013.01); *C02F 2201/007* (2013.01); *C02F 2201/008* (2013.01); *C02F 2203/006* (2013.01); *C02F 2203/008* (2013.01); *C02F 2209/005* (2013.01); *C02F 2209/02* (2013.01); *C02F 2209/04* (2013.01); *C02F 2209/05* (2013.01); *C02F 2209/06* (2013.01); *C02F 2209/11* (2013.01); *C02F 2209/22* (2013.01); *C02F 2209/42* (2013.01); *C02F 2303/04* (2013.01); *C02F 2303/16* (2013.01); *Y02W 10/15* (2015.05)

(56) References Cited

U.S. PATENT DOCUMENTS

| | | | | |
|---|---|---|---|---|
| 5,632,892 | A * | 5/1997 | Klein | B01D 61/08 |
| | | | | 210/108 |
| 7,172,693 | B2 * | 2/2007 | Reid | B01D 35/301 |
| | | | | 210/232 |
| 2005/0100483 | A1 * | 5/2005 | Guiney | B01D 35/143 |
| | | | | 422/400 |
| 2007/0241037 | A1 | 10/2007 | Wang | |
| 2014/0238914 | A1 * | 8/2014 | Newman | A01K 63/045 |
| | | | | 210/167.22 |
| 2016/0220925 | A1 * | 8/2016 | Savoy | B01D 27/08 |

* cited by examiner

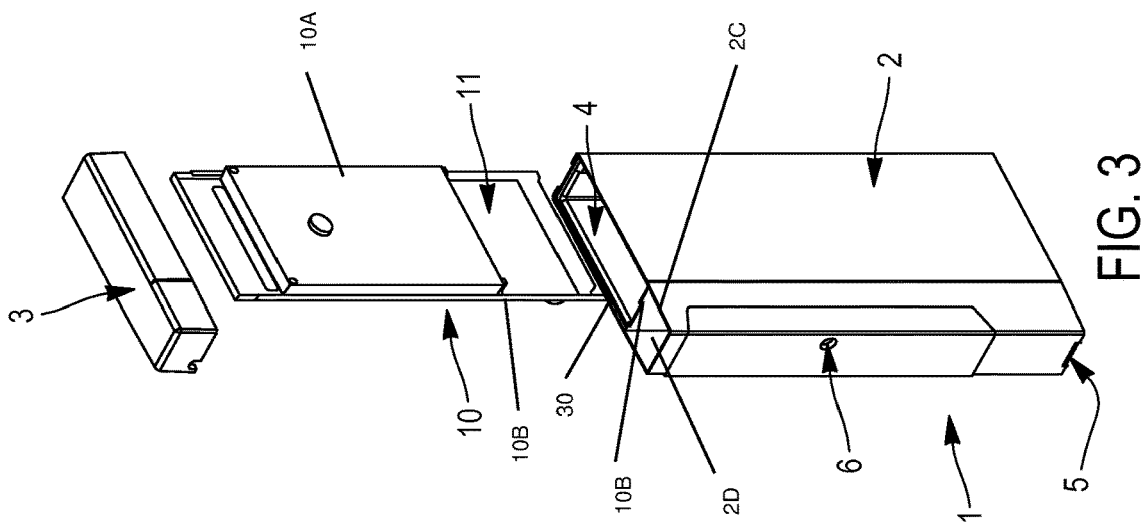
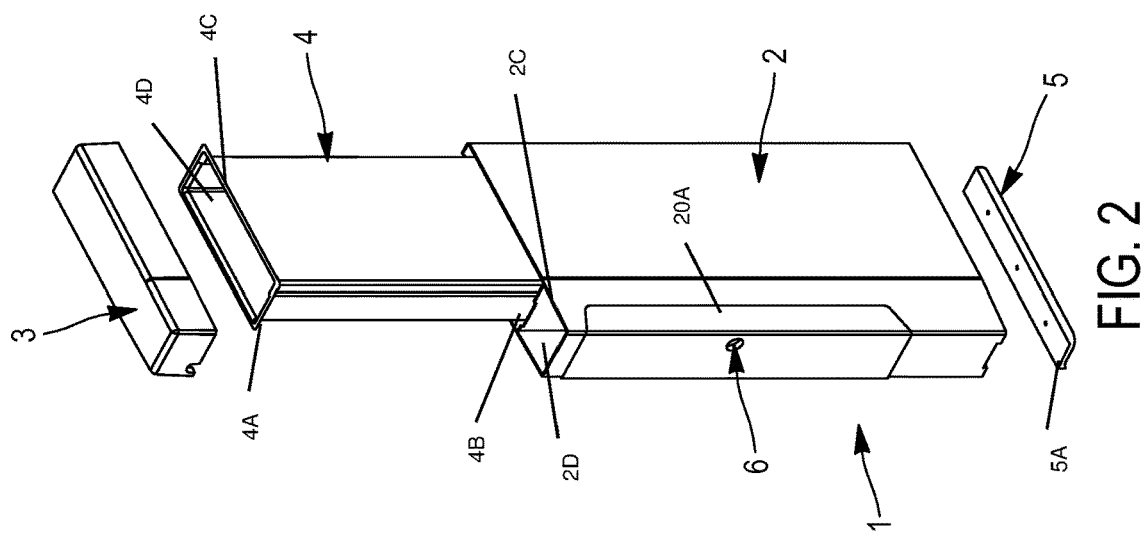
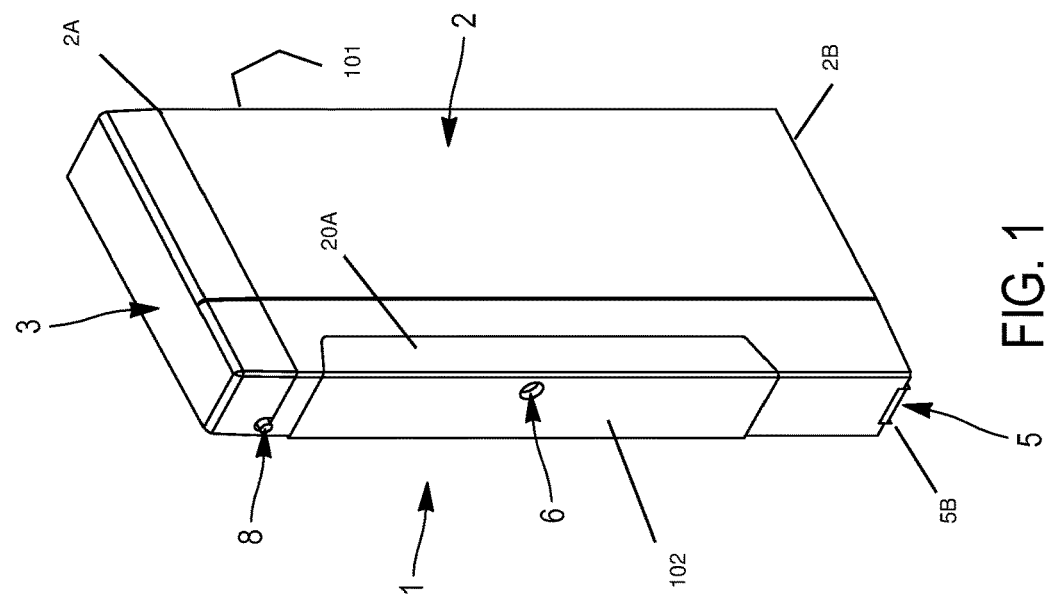

MOBILE, REPLACEABLE, AND REGENERABLE CARTRIDGE FOR TREATMENT OF WATER

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a mobile, replaceable and regenerable water treatment cartridge, used in the water treatment field and able to be connected to that end into a water treatment circuit conveying water of different quality levels in which it carries out operations more particularly related to a step of said treatment.

2. Description of Related Art Including Information Disclosed Under 37 CFR 1.97 and 37 CFR 1.98

The cartridges may have different functions, for example the biological treatment of wastewater assuming the form of effluents generated by toilets, using live purifying activated sludge in the cartridge. Such bacteriological treatment is used as a preferred example in the rest of the text, but is far from being the only one, many other example treatments being able to apply, such as the implementation of reverse osmosis, ozone disinfection, demineralization by ion exchange resin, and mineralization, etc. The invention also relates to a water treatment device based on the modular composition of one or several host stations of one or several cartridges, and making it possible to treat variable water capacities and/or to implement different treatment chains, for example the aforementioned biological treatment of effluents generated by toilets, varying degrees of purification (ranging from the quality required for bathing water up to that required for potable water), filtration, waste leveraging, etc.

BRIEF SUMMARY OF THE INVENTION

The idea at the base of the invention consists of a quantitative and qualitative, i.e., functional, division of the water treatment chain, implemented by standardized cartridges that perform a treatment function for a given volume or flow rate of fluid to be treated. Each cartridge must be operational once it is connected to the host station and, secondarily, the replacement operations must be very simple and immediate to perform, the maintenance or regeneration if applicable not being done on site. The invention in other words allows an operation described as "plug-and-play", term initially used in the computer world for the peripherals connected to a central unit, and which has subsequently come to be used in many other technical fields and in the French language.

In the case at hand, it suffices to connect the cartridge to connecting means, for example of a host station, so that it is ready to use immediately. The connection in practice involves several types of connectors, which primarily relate to fluids on the one hand, and power and data on the other hand. Each cartridge according to the invention to that end includes intake and discharge pipe connectors for at least one fluid, as well as connector ports for power and information transport input/output channels.

In order for the notion "ready to use upon connection" to assume its full meaning, the cartridge according to the invention must be mobile and easily movable, and consequently have a limited weight and a reasonable compactness. The movements of the cartridges also make it useful to install means directly on the cartridge that give it a certain mobility.

The cartridges are lastly designed to perform their function, relative to a control-command unit, during the longest possible period, which may reach up to several months. Information on the treatment in progress is exchanged in real-time with electronic processing means using data transport channels.

At the end of the autonomy period, in the example of the biological treatment of toilet effluents, the cartridge is removed and replaced with another identical cartridge that is at the beginning of its autonomy cycle. The replaced cartridge is sent to a maintenance site, for example in order to regenerate any filtration membranes used, to replace components at the end of their life and decrease the concentration level of the purifying sludge.

For these purposes, and in order to make the replacement and maintenance operations as quick and easy as possible, the cartridge is designed such that it includes:

an outer shell having an upper opening that can be hermetically sealed by a lid, as well as at least one rapid access to the connectors and connecting ports;

an inner shell also having an upper opening, delimiting an internal volume of the cartridge in which all of the technical equipment for the operation of the cartridge is placed, secured to at least one structure able to be inserted into the internal volume through the opening, said volume and the structure(s) including mutual guiding means for final positioning thereof inside the internal volume;

means for handling the cartridge, secured to the outer shell;

means for rendering the cartridge mobile.

This separation into an outer shell, inner shell and support structure(s) of the components greatly facilitates manipulations on the cartridge, in particular when it undergoes maintenance on a specialized site. To the extent possible, a single support structure for all of the equipment is provided, for example in the form of a chassis. In any case, the design provides a minimal number thereof. Thus, when the outer shell, the functions of which will be specified below, is open, the disassembly of the functional elements is practically immediate.

In the scenario of a cartridge targeting wastewater treatment, i.e., effluents generated by toilets using activated purifying sludge living in the cartridge, the latter more specifically includes:

an internal water treatment reservoir delimited by the inner shell; and a chassis able to be inserted into the inner shell that serves as a lining, said chassis including all of the technical equipment for the operation of the cartridge.

In this case, the removal of the chassis makes it possible to access, in a single operation, all of the equipment and components of the system, while freeing access to the reservoir. The idea is to fasten all of the components in a cluster on the chassis, to facilitate manipulation thereof.

Still more specifically, in this application, the chassis includes at least one plate delimiting compartments in the reservoir; the technical equipment for the operation of the cartridge equipping the chassis next being able to include:

guiding/positioning means in the reservoir;
fluid pipes;
connectors to connecting means, preferably sealed, quick and without tools, for the fluid intake and discharge pipes;
connection ports provided with connectors allowing a quick and tool-free connection/disconnection of the power and data transport input/output channels;
measuring instruments;
sensors.

The guiding/positioning means allow guiding of the chassis in the inner shell that serves as a liner for the latter, in combination with guiding means equipping the inner wall of said shell, including their respective shapes, such that all of this equipment is correctly positioned for the function to be performed when the chassis is fully inserted. Each component, fastened in advance on said chassis, is positioned in a predetermined manner to perform its function, without it being necessary to further adjust its position, when the chassis is positioned.

Indeed, and this is another interesting advantage of the above design, allowing successive nesting of the inner shell in the outer shell and of the chassis in the inner shell, said shells can be in a single piece, with no orifice other than the upper opening. It then suffices to ensure the sealing at the borders of the upper opening, on a periphery also oriented substantially perpendicular to the closing direction, during the placement of the lid of the outer shell. The sealing is therefore managed at the lid of the outer shell, the aforementioned perpendicularity in practice facilitating the production of the sealing.

According to the invention, the shells are preferably molded from a composite material, which on the one hand allows them to be manufactured in one piece provided with a single opening, and also offers great flexibility in the choice of the material based on the usage context of the cartridges (vibrations, impacts, resistance to liquids and/or bacteria, etc.). Preferably, an insulating material is inserted between the outer shell and the inner shell in order to limit heat exchanges with the outside environment.

It is previously mentioned the need to ensure a certain mobility for each cartridge, useful during substitutions, which necessarily involve movements, even small ones, during the replacement operation. Thus, according to the invention, each cartridge may have means for rendering (See FIGS. 1-2, reference numeral 5) the cartridge mobile including at least one axle (See FIG. 2, reference numeral 5A as a sliding rolling support) with at least one rolling member (See FIG. 1, reference numeral 5B) protruding below the outer shell.

In practice, these means for rendering the cartridge mobile may consist of a rolling support on which the cartridge is fastened removably. Such a support may be designed for longer movements, if applicable.

Structurally, the chassis may include at least one vertical plate, the plate(s) defining adjacent columns in the reservoir, each plate arranging upper and lower sludge circulation passages.

According to the invention, the equipment of the chassis may for example include, in the aforementioned hypothesis of bacteriological wastewater treatment:

at least one air diffuser per column, and their respective supply pipes;
at least one effluent intake pipe;
at least one emptying pipe;
a membrane filter and its permeation pipe;
at least one connector plate comprising connectors to the fluid intake and discharge pipes and/or connecting ports for power and data transport input/output channels;
measuring instruments;
sensors.

These components make it possible to maintain an appropriate environment to make the purifying sludge sustainable, at least during the activity period of the cartridge, for the treatment of effluents arriving in the reservoir. They also see to the exchange of data so as to be able to monitor the treatment continuously. In principle, the cartridges do not undergo maintenance operations on their exploitation site, but in the event emptying is done, irrespective of the reason and first of all to facilitate the removal of the cartridge, the emptying pipe is dimensioned such that it can be done in several minutes, at best in around two minutes.

The sensors and measuring instruments are provided to collect data in real time on a certain number of parameters necessary for the proper operation of the treatment process. The sensors operate in all or nothing mode, while the measuring instruments provide evolutive information. In particular, at least two level alert sensors must be provided.

Furthermore, at least the following sensors and measuring instruments may equip the chassis:

at least one temperature measuring instrument;
at least one instrument for measuring the oxydo-reduction (Redox) potential and/or a dissolved oxygen (DO) sensor;
at least one pH sensor;
at least one turbidity sensor; and
at least one conductivity sensor.

All of the information sent by these sensors and measuring instruments is processed by at least one control-command unit, which can, in case of operating anomaly, send alert signals to a control structure located remotely, or even stop treatment if absolutely necessary. It can also regulate the operation of the various pieces of equipment in order to perform optimal treatment and achieve maximum autonomy of the cartridge in question.

According to one possibility, the cartridge is parallelepiped, the connectors of the fluid intake and discharge pipes and/or connecting ports of the power and data transport input/output channels being placed on a first side of the cartridge situated opposite a second side including at least part of the means for handling the cartridge in order to move it, said connectors and ports being able to connect very quickly to receiver connectors of a host station, the connections being done automatically when the first side of the cartridge abuts in the host station. The parallelepiped appearance is not neutral, this shape being particularly well-suited to axial guiding in a host station housing, guiding which must be precise enough to allow connections to be established.

With the aim of making the manipulations of the cartridges as easy, convenient and quick as possible, it consequently suffices to insert the cartridge into its host station, the connections being done directly at the end of travel when the insertion of the cartridge is complete.

When this is the case, it is possible to actuate a connection locking lever placed in or near the side including the handling means of the cartridge, the activation of said lever causing the mechanical locking of the cartridge in the host station at the same time as the opening of the fluid intake and discharge connectors and that of the connecting ports of the power and data transport input/output channels. Such a lever operates somewhat like an acknowledgment latch.

In any case, the set of technical features developed above allows very simple manipulation of the cartridges for their replacement, without any unwanted leaking occurring at the time of the substitution, the maintenance operations themselves being greatly facilitated by the very design of the cartridges.

The invention also relates to a water treatment device, for example to treat wastewater, which primarily includes:

at least one host station able to house at least one water treatment cartridge, and having:

outside connectors to sealed, quick and tool free-means for connecting fluid intake and discharge pipes;

outside connecting ports to connectors allowing a quick and tool-free connection/disconnection of power and data transport input/output channels;

internal compartments each able to house a cartridge, the bottom of which is equipped with internal fluid connectors, as well as internal connecting ports for power and data transport input/output channels;

means for guiding cartridges being provided in each compartment so that once the cartridges are abutting, they are connected to said internal connectors and connecting ports;

at least one cartridge, a first side of which has fluid intake and discharge connectors and power and data transport input/output channel connecting ports, said first side being situated opposite a second side including handling means (See FIGS. 1-2 for grip 20A) for moving it;

said connectors and ports of each cartridge being able to connect automatically to internal connectors and ports of a host station, the connections being done automatically when the cartridge abuts in a compartment.

As previously mentioned, the cartridges may have different treatment functions of the liquid: it may involve multiple functions related to water treatment, with the very general aim of purifying it, each cartridge being specialized in a specific treatment. The host station of the device according to the invention allows a very flexible modular implementation, due to the selected functional division.

It is thus possible to associate complementary functions to increase the degree of purification of the wastewater, or to increase the treatment capacity by combining at least two cartridges having the same function to treat a larger volume of water. Thus, the implementation of reverse osmosis may follow an initial bacteriological treatment, in order to give the treated water a higher water quality, the osmosis being able, if necessary, to be followed by ozone disinfection, or even ion exchange resin treatment and mineralization to make it potable. Each of these operations is in practice done by a cartridge specifically assigned to the given function.

Other operations, for example leading to leveraging of the contents of the cartridges, can also be offered by the cartridges, for example transforming toilet effluents into crop fertilizers. Still more generally, the cartridges may in fact be designed for physicochemical or electrochemical treatment of the water, depending on the considered types of applications.

Furthermore, each host station may include electronic processing means for data coming from the cartridge(s) that it houses, and in particular means for sending/receiving and/or transferring at least some of this information derived from at least one cartridge.

These electronic means are based on at least one program for processing parameters from the sensors and measuring instruments, and allow the host station to react to certain situations defined by the parameters from the sensors and measuring instruments, and also is applicable to send alerts, when the treatment may not be automated, but depends on a human decision. The program itself is potentially configurable depending on the functions that the host station makes it possible to carry out.

BRIEF DESCRIPTION OF THE SEVERAL VIEWS OF THE DRAWINGS

The invention will now be described in more detail, in the preferred example of the biological treatment of effluents generated by toilets, in reference to the appended figures.

FIG. 1 shows a perspective view of a cartridge according to the present invention.

FIG. 2 shows an exploded perspective view of the assembly of the inner and outer shells.

FIG. 3 shows a perspective view of the chassis able to be inserted into said assembled shells.

DETAILED DESCRIPTION OF THE INVENTION

Figure 5:
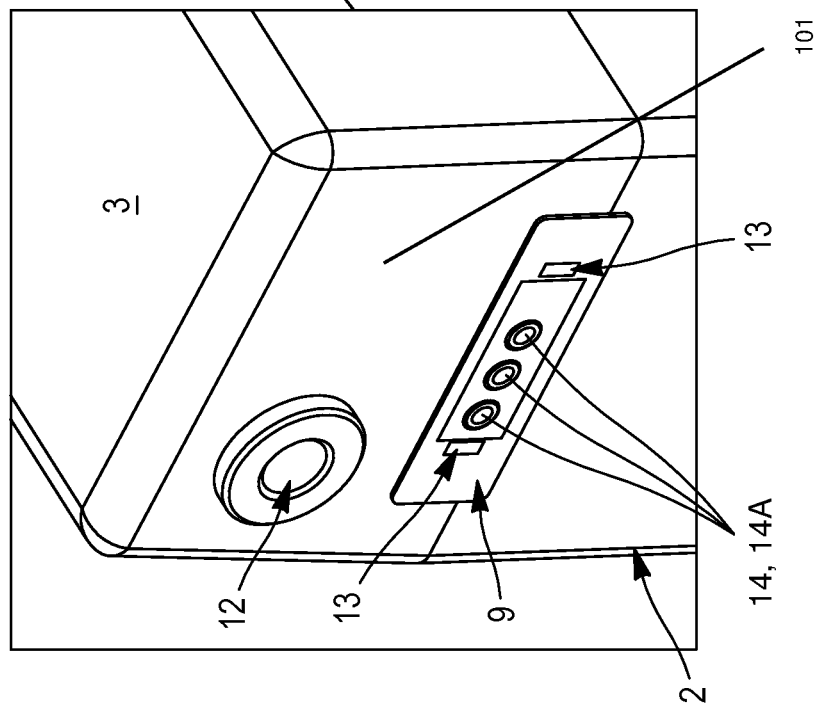
FIG. 5 shows a perspective view of an enlargement of the upper corner of the cartridge provided with connecting means.

In reference to FIG. 1, the cartridge (1) is made up, from the outside, essentially of an outer shell (2) and an upper lid or lid (3). More specifically, as shown in FIG. 2, the outer shell (2), having a first side 101, a second side 102 opposite the first side, an outer shell top 2A and an outer shell bottom 2B opposite the outer shell top, houses an inner shell (4), having an inner shell top 4A and an inner shell bottom 4B opposite that inner shell top, that in fact adjusts in an insulating intermediate layer 30. A means for rendering mobile or rolling support (5) fastened to the outer shell (2) removably makes it possible to allow the movement of the cartridge (1). The latter has a substantially parallelepiped shape, this shape making it possible to optimize its storage during maintenance operations and its use in combination with a host station for example on a train, the parallelepiped compartments being particularly advantageous for guiding/housing the cartridges.

A connector (6) allows the connection to a supply pipe coming from the outside circuit conveying the fluid to be treated. The chassis (10) appears in FIG. 3, being in removable sliding engagement with the inner shell through the upper inner shell opening and being comprised of a membrane filter 10A, a connector plate 9, and means 10B for guiding placement of the chassis in an inner shell internal volume 4D. It is on this part that the equipment is concentrated in a cluster, such that for any maintenance operation, it suffices to remove the internal shell (4) to be able to perform a complete technical treatment. This chassis (10) is primarily based on a vertical plate (11), which, in the case at hand, defines, with the internal volume of the shell (4) delimiting a reservoir as an internal water treatment reservoir, two parallel vertical treatment columns as adjacent columns to form the internal water treatment reservoir within the inner shell internal volume 4D, the membrane filter 10A being in fluid connection with each adjacent column. There can be additional equipment being comprised of at least one air diffuser for each adjacent column, sensors and measuring instruments. The second connector 14 can be in fluid connection with at least one adjacent column as an effluent intake pipe, and the cartridge can further comprise a third connector 14A being in fluid connection with the inner shell internal volume 4D and being positioned on the connector plate so as to be accessible on the first side of said outer shell as in FIG. 5. The third connector can be in fluid connection with the at least one adjacent column as an emptying pipe.

A certain number of sensors and measuring instruments can be equipment alone with the membrane filter 10A arranged on this plate (11), regarding which no details are necessary at this time.

In reference to FIG. 3, the assembly of the different elements of the cartridge (1) according to the invention is well illustrated. Thus, the inner shell (4) being comprised of an upper inner shell opening 4C so as to define the inner shell internal volume 4D, is inserted into the outer shell (2) being comprised of an upper outer shell opening 2C and the lid 3 in removable sealing engagement with the upper outer shell opening so as to define an outer shell internal volume 2D until the inner shell abuts by gravity at the outer shell bottom 2B of the latter. Then, the chassis (10) itself is slid and guided by gravity in the inner shell (4) with said means 10B for guiding placement of the chassis in an inner shell internal volume 4D as a rail or vertical plate 11 in a shoulder groove of FIG. 3.

In reference to FIG. 1, the pipe (8) that appears on the left side of the cartridge (1) is assigned to emptying during maintenance operations, for example when it involves a wastewater biological treatment cartridge, for which the bacterial medium is regenerated before reconditioning a new cartridge. This hose (8) is accessible from outside the lid (3).

A connector plate (9), for example secured to the chassis (10), includes both fluid connectors (14) and power and data transport input/output ports, as will be seen in detail below. This connector plate (9) is also accessible from outside the cartridge (1), as in particular shown in the enlarged detail appearing in FIG. 5. It may in particular include a connector connected to an internal discharge tube for fluid treated by the cartridge (1), and an air intake connector connected to an external pump sending pressurized air therein (not shown, belonging to the external circuit in which the cartridge (1) is connected).

Figure 4:
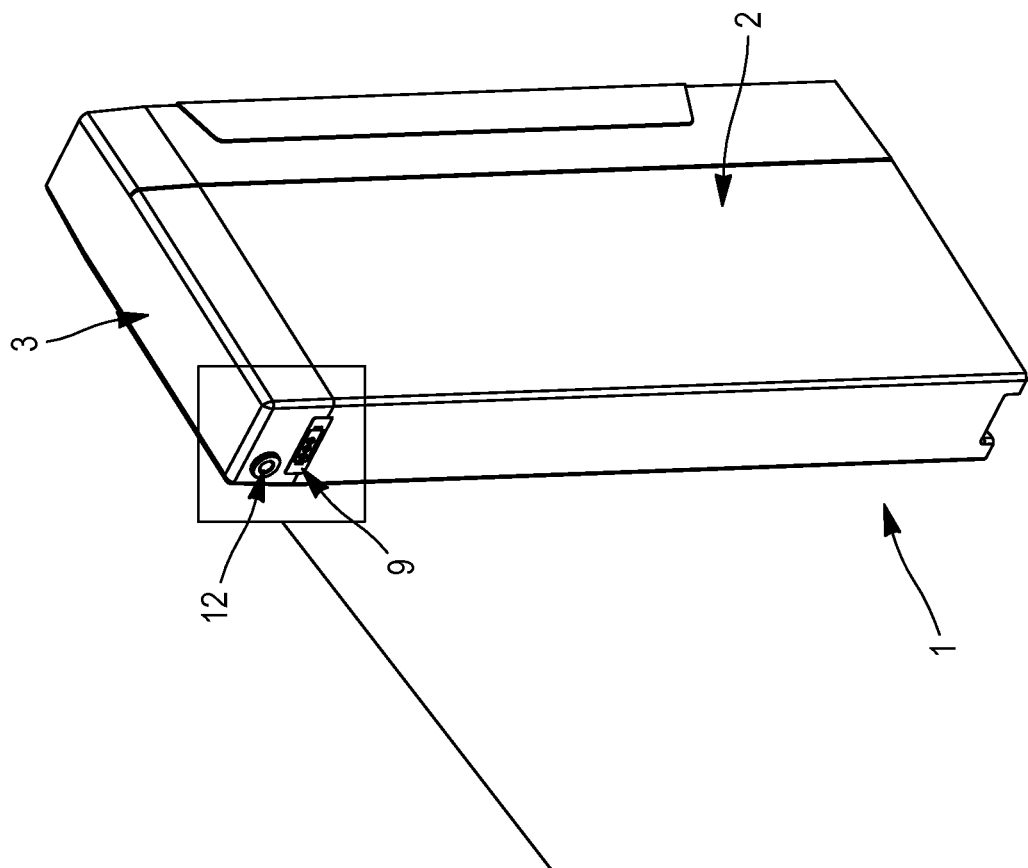
FIG. 4 is a perspective view of the cartridge seen from the opposite side.

An air discharge stopper (12) is also provided near the connector plate (9) (see FIGS. 4 and 5). On the lateral sides of said plate (9), power and data transport input/output ports (13) are provided for the connection for example to a power source, and/or electronic means for processing signals from the sensors and/or measuring instruments, making up the useful data from which the proper operation of the cartridge (1) can be evaluated.

When the cartridge (1) according to the invention is for example used for the biological treatment of wastewater generated by toilets on a train, the cartridge (1) is inserted into a host station located in the train, which includes electronic data processing means. The connection of the various connectors (14) and ports (13) is done automatically when the cartridge abuts in its host station, in particular guided by a means for guiding placement of the cartridge within the internal compartment to a locked position as the complementary shapes of the cartridge and the compartment of the host station. The connection between the power or data transport input/output ports (13) and a control unit is in particular done automatically.

The connection of such a cartridge (1) in a wastewater treatment circuit assumes the connection of the connector (6) with an intake pipe for effluents coming from a toilet basin. The treated water can be returned, directly or via other treatment steps, to the toilets in order to fill the flush tank. These fluid connections are also implemented automatically when the cartridge (1) abuts at the bottom of its housing, and automatically closed off in case of removal of the cartridge (1).

FIG. 2 shows, in a simplified manner, the rolling support (5) of the cartridge (1), in the form of a profile for example including a plurality of rollers that can be situated at the ends of said profile.

The example embodiment resulting from the figures is of course not exhaustive with respect to the invention. The latter on the contrary encompasses all alternative shapes and configurations resulting from the claims, the parallelepiped shape in particular not being restrictive, although it is practical. Furthermore, the allocation of a cartridge (1) to a function other than the biological treatment of effluents may lead to a substantially different chassis, or the placement in the inner shell of several chasses and/or structures supporting components and equipment capable of performing the function of the cartridge, without there necessarily being a reservoir, etc.

We claim:

1. A mobile, replaceable and regenerable water treatment cartridge, comprising:
    an outer shell having a first side, a second side opposite said first side, an outer shell top and an outer shell bottom opposite said outer shell top, said outer shell being comprised of an upper outer shell opening and a lid in removable sealing engagement with said upper outer shell opening so as to define an outer shell internal volume;
    an inner shell having an inner shell top and an inner shell bottom opposite said inner shell top, said inner shell being comprised of an upper inner shell opening so as to define an inner shell internal volume;
    a chassis being in removable sliding engagement with said inner shell through said upper inner shell opening and being comprised of a connector plate, and means for guiding placement of said chassis in said inner shell internal volume;
    a membrane filter attached to said chassis;
    means for handling on said second side of said outer shell;
    means for rendering mobile on said outer shell bottom of said outer shell;
    a first connector being in fluid connection with said outer shell internal volume and being positioned on said second side of said outer shell;
    a second connector being in fluid connection with said inner shell internal volume and being positioned on said connector plate so as to be accessible on said first side of said outer shell; and a connection port being connected to said equipment and being positioned on said connector plate so as to be accessible on said first side of said outer shell.

2. The cartridge, according to claim 1, wherein said chassis has a position set by said means for guiding placement of said chassis in said inner shell internal volume so as to define an internal water treatment reservoir within said inner shell internal volume, said equipment in fluid connection with said internal water treatment reservoir.

3. The cartridge, according to claim 2, further comprising: an equipment attached to said chassis, said equipment being comprised of sensors and measuring instruments.

4. The cartridge, according to claim 1, wherein said inner shell is made integral with said outer shell.

5. The cartridge, according to claim 1, wherein said outer shell is comprised of composite material, and wherein said inner shell is comprised of said composite material.

6. The cartridge, according to claim 1, further comprising: an insulating intermediate layer between said inner shell and said outer shell.

7. The cartridge, according to claim 1, wherein said means for rendering mobile on said outer shell bottom of said outer shell is comprised of an axle and a rolling member.

8. The cartridge, according to claim 7, wherein said means for rendering mobile on said outer shell bottom of said outer shell is in removable sliding engagement with said outer shell bottom.

9. The cartridge, according to claim 1, wherein said chassis comprises a vertical plate, and wherein said chassis has a position set by said means for guiding placement of said chassis in said inner shell internal volume so as to define adjacent columns as an internal water treatment reservoir within said inner shell internal volume, said membrane filter being in fluid connection with each adjacent column.

10. The cartridge, according to claim 9, further comprising: an equipment attached to said chassis, said equipment being comprised of at least one air diffuser for each adjacent column, sensors and measuring instruments,
wherein said second connector is in fluid connection with at least one adjacent column as an effluent intake pipe,
wherein the cartridge further comprises a third connector being in fluid connection with said inner shell internal volume and being positioned on said connector plate so as to be accessible on said first side of said outer shell, and
wherein said third connector is in fluid connection with said at least one adjacent column as an emptying pipe.

11. The cartridge, according to claim 10, wherein said sensors are comprised of at least two level alert sensors.

12. The cartridge, according to claim 10, wherein said measuring instruments are comprised of a temperature measuring instrument, and an oxygen measuring instrument, and wherein said sensors are comprised of a pH sensor, a turbidity sensor, and a conductivity sensor.

13. The cartridge, according to claim 12, wherein said outer shell is parallelepiped.

14. A device for treatment of water, comprising:
a cartridge, according to claim 1; and
a host station in removable engagement with said cartridge,
wherein said host station is comprised of an internal compartment with outside connectors, outside connecting ports, and a means for guiding placement of said cartridge within said internal compartment to a locked position,
wherein at least one outside connector is in fluid connection with said second connector in said locked position, and
wherein at least one outside connecting port is connected with said connection port in said locked position.

15. The device, according to claim 14, further comprising:
a connection locking lever being positioned on said host station so as to hold said cartridge in said locked position.

16. The device, according to claim 14,
wherein said host station further comprises a data processing means being connected to said equipment through said connection port.

* * * * *